(12) United States Patent
Huang

(10) Patent No.: US 8,955,572 B2
(45) Date of Patent: Feb. 17, 2015

(54) TRIGGER-OPERATED ADHESIVE TAPE DISPLENSER

(71) Applicant: Harrison Huang, Taichung (TW)

(72) Inventor: Harrison Huang, Taichung (TW)

( * ) Notice: Subject to any disclaimer, the term of this patent is extended or adjusted under 35 U.S.C. 154(b) by 107 days.

(21) Appl. No.: 13/910,823

(22) Filed: Jun. 5, 2013

(65) Prior Publication Data
US 2014/0311677 A1    Oct. 23, 2014

(30) Foreign Application Priority Data
Apr. 19, 2013    (TW) .............................. 102114013 A

(51) Int. Cl.
*B29C 65/00*    (2006.01)
*B44C 7/00*    (2006.01)
*B65H 35/06*    (2006.01)

(52) U.S. Cl.
CPC ................ *B65H 35/06* (2013.01); *B29C 65/00* (2013.01); *B44C 7/00* (2013.01)
USPC ............ 156/527; 156/577; 156/579; 156/523

(58) Field of Classification Search
CPC .......... B29C 65/00; B29C 65/30; B44C 7/00; B65H 35/00; B65H 35/07; B65H 35/06; B32B 38/10; B32B 37/12; B32B 38/04; B32B 37/00; B32B 51/00
USPC ......... 156/577, 579, 574, 525, 527, 523, 510, 156/543
See application file for complete search history.

(56) References Cited

U.S. PATENT DOCUMENTS 2,532,596 A * 12/1950 Bobrov .......................... 156/523
3,399,100 A *  8/1968 Hansjorg ....................... 156/523
3,813,275 A *  5/1974 Weick et al. ................... 156/527

\* cited by examiner

*Primary Examiner* — Alex Efta
(74) *Attorney, Agent, or Firm* — Muncy, Geissler, Olds & Lowe, P.C.

(57) ABSTRACT

A trigger-operated adhesive dispenser includes a rack, a handle affixed to the rack, a swing frame pivotally mounted at the rack, a cutter blade fixedly mounted at the rack, a stopper member pivotally mounted at the rack, and a trigger mounted at the handle. When the trigger is not pressed, the swing frame is stopped by the stopper member and prohibited from being biased, allowing the adhesive tape to be pulled out and adhered to the object to be packed. When pressing the trigger, the trigger will push the stopper member to release the swing frame, enabling the swing frame to be biased, and thus the cutter blade can forced to cut off the applied adhesive tape.

8 Claims, 8 Drawing Sheets

TRIGGER-OPERATED ADHESIVE TAPE DISPLENSER

BACKGROUND OF THE INVENTION

1. Field of the Invention

The present invention relates to adhesive tape dispensing technology and more particularly, to a trigger-operated adhesive tape dispenser.

2. Description of the Related Art

When using a conventional adhesive tape dispenser, it is to adhere one end of the adhesive tape of the loaded adhesive tape roll to the surface area of the object to the packed, and then move the adhesive tape dispenser to pull the adhesive tape out of the adhesive tape roll subject to the desired length. During rotation of the tae holder wheel to let off the adhesive tape of the adhesive tape roll, the adhesive tape is smoothly adhered to the surface of the object. At final, use the cutter blade to cut off the applied adhesive tape. Thus, the use of the adhesive tape dispenser can effectively simplify the packing process and enhance the packing efficiency.

However, before cutting off the applied adhesive tape, the user must rotate the tape dispenser and apply a certain amount of downward pressure to the adhesive tape dispenser to force the roller against the adhesive tape and to increase the tension of the adhesive tape that is been pulled out, enabling the cutter blade to cut off the applied adhesive tape. If the downward pressure applied to adhesive tape dispenser is insufficient or the direction of the applied downward pressure is not correct, the applied adhesive tape will not be easily cut off by the cutter blade. When this problem occurs, the user must repeatedly adjust the applied pressure and angle till that the adhesive tape can be smoothly cut off, Thus, the operation of the aforesaid conventional adhesive tape dispenser is inconvenient and requires much effort.

SUMMARY OF THE INVENTION

The present invention has been accomplished under the circumstances in view. It is the main object of the present invention to provide a trigger-operated adhesive tape dispenser, which has the advantages of effortless operation and ease of use.

To achieve this and other objects of the present invention, a trigger-operated adhesive tape dispenser of the present invention comprises a support unit, a tape holder wheel, a swing unit, a cutting unit, a stopper member, a trigger, a first return member, and a second return member. The support unit comprises a rack, and a handle affixed to the rack. The tape holder wheel, is pivotally mounted at the rack for holding an adhesive tape roll. The swing unit comprises a swing frame, a first roller and a second roller. The swing frame is pivotally mounted at the rack. The first roller and the second roller are respectively pivotally mounted at top and bottom sides of the swing frame. The cutting unit comprises a cutter holder and a cutter blade. The cutter holder is fixedly mounted at the rack between the first roller and said roller of the swing unit. The cutter blade is affixed to the cutter holder and adapted for cutting off the adhesive tape. The stopper member is pivotally mounted at the rack and movable between a stop position and a release position, comprising a stop portion and an extension portion. When the stopper member is in the stop position, the stop portion of the stopper member is stopped against the swing frame, prohibiting the swing frame from being biased. When the stopper member is in the release position, the stop portion of the stopper member is kept away from the swing frame, allowing the swing frame to be biased. The trigger is mounted at the handle and movable relative to the handle between an initial position and a pressed position, comprising a protruding portion. When the trigger is in the initial position, the protruding portion of the trigger is stopped against the extension portion of the stopper member to keep the stopper member in the stop position, allowing the first roller and the second roller to be rotated to adhere the adhesive tape of the adhesive tape roller to the object to be packed. When the trigger is in the pressed position, the protruding portion of the trigger pushes the extension portion of the stopper member to bias the stopper member from the stop position to the release position, allowing the cutter blade to cut off the applied adhesive tape. The first return member is mounted at the stopper member and adapted to keep the stopper member in the stop position. The second return member is mounted between the trigger and the handle, and adapted to keep the trigger in the initial position.

Preferably, the trigger-operated adhesive tape dispenser further comprises a pressure plate and a gear wheel. The pressure plate is pivotally mounted at the handle, comprising at least one rib. The gear wheel is pivotally mounted at the rack and flexibly meshed with the gear wheel to keep the adhesive tape in therebetween, preventing the adhesive tape from being rolled back.

Thus, when using the trigger of the trigger-operated adhesive tape dispenser, press the trigger to the pressed position to bias the stopper member to the release position. When the swing frame receives a pressure at this time, it will be biased to let the cutter blade be stopped against the adhesive tape, and the adhesive tape can be cut off easily by the cutter blade at this time, achieving the effects of effortless operation and ease of use.

DETAILED DESCRIPTION OF THE INVENTION

Figure 1:
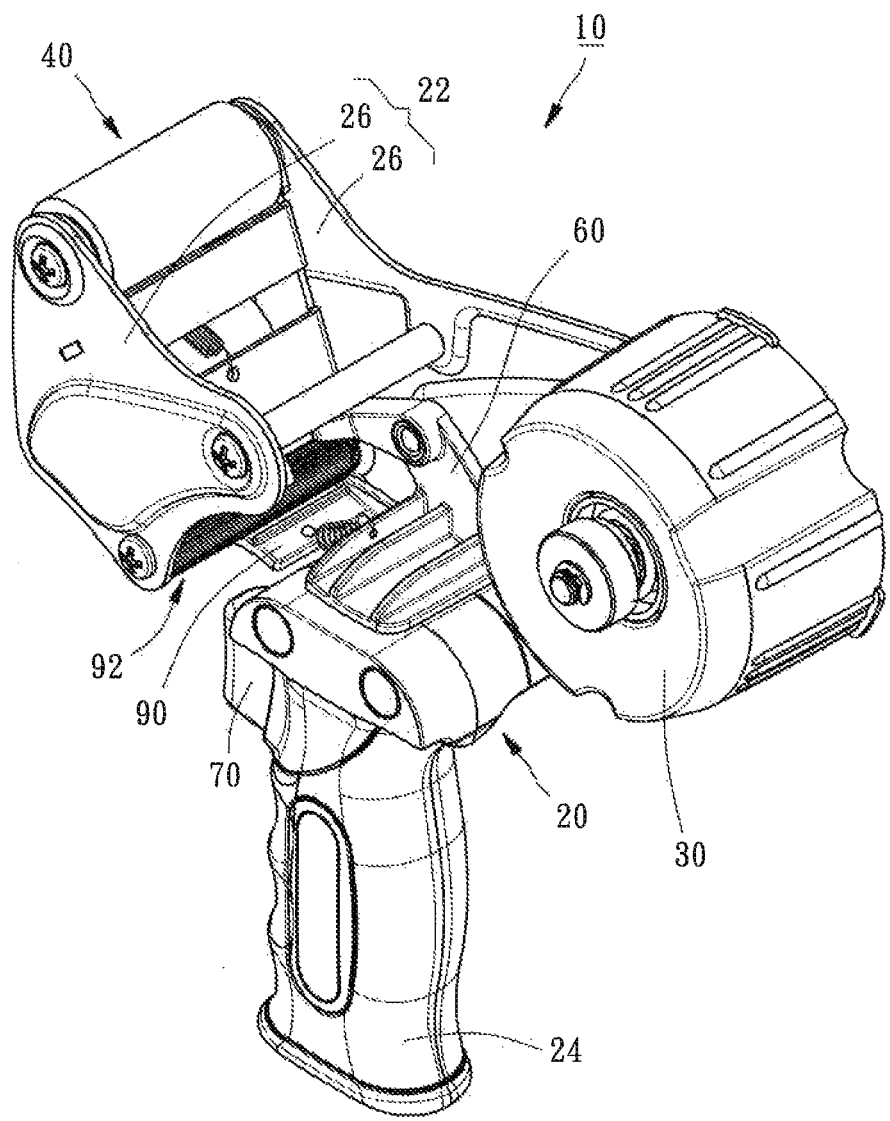
FIG. 1 is an elevational view of a trigger-operated adhesive tape dispenser in accordance with the present. invention.
Figure 2:
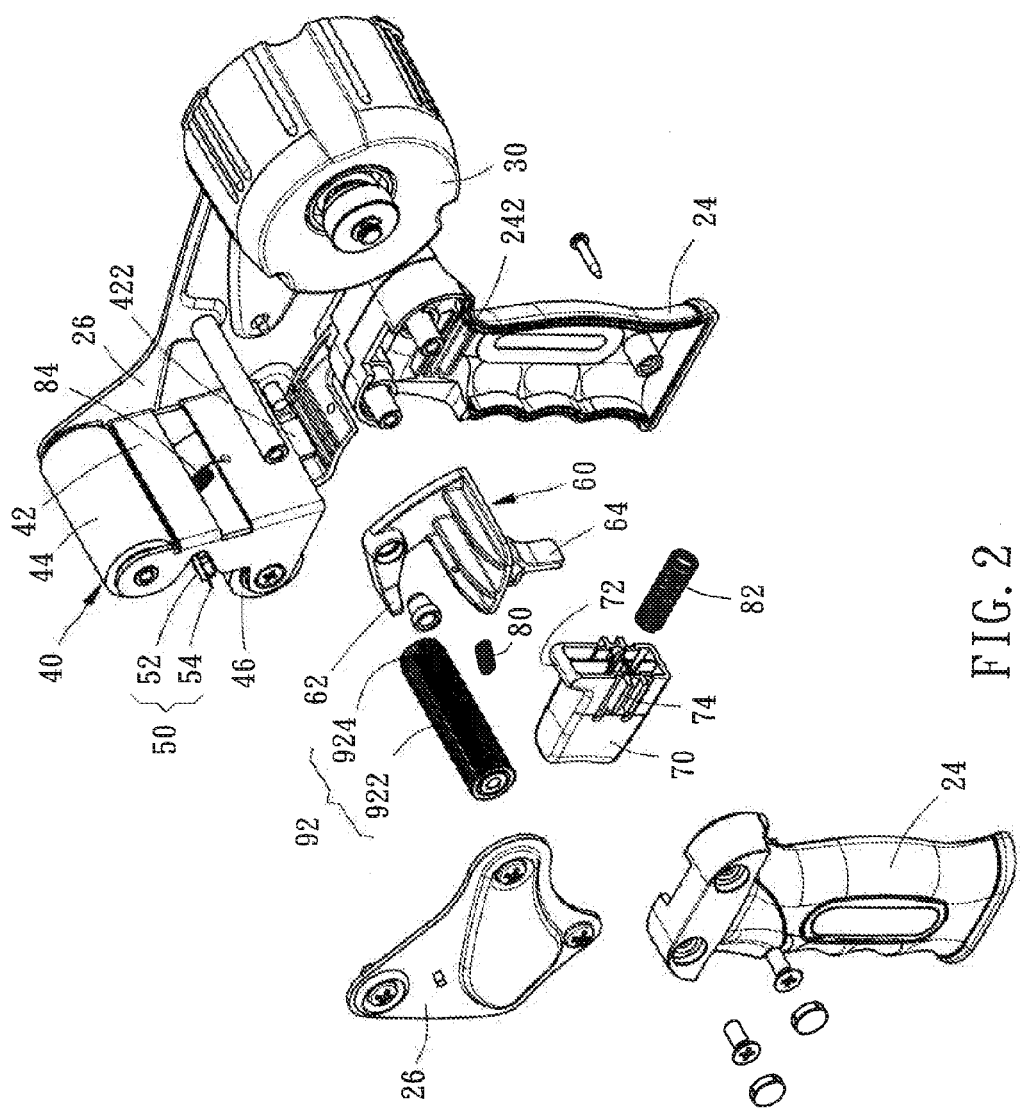
FIG. 2 is an exploded view of the trigger-operated adhesive tape dispenser in accordance with the present invention.

Referring to FIGS. 1 and 2, a trigger-operated adhesive tape dispenser 10 in accordance with the present invention is shown. The trigger-operated adhesive tape dispenser 10 comprises a support unit 20, a tape holder wheel 30, a swing unit 40, a cutting unit 50, a stopper member 60, a trigger 70, a first return member 80, and a second return member 82.

The support unit 20 comprises a rack 22 and a handle 24. The rack 22 is formed of two opposite side panels 26. However, this structural configuration is not a limitation. The handle 24 has a top end thereof fixedly connected to a bottom side of one side panel 26, and is configured for holding by the user. Further, the handle 24 defines a first guide portion 242 in each of two opposite inner sides thereof.

Figure 6:
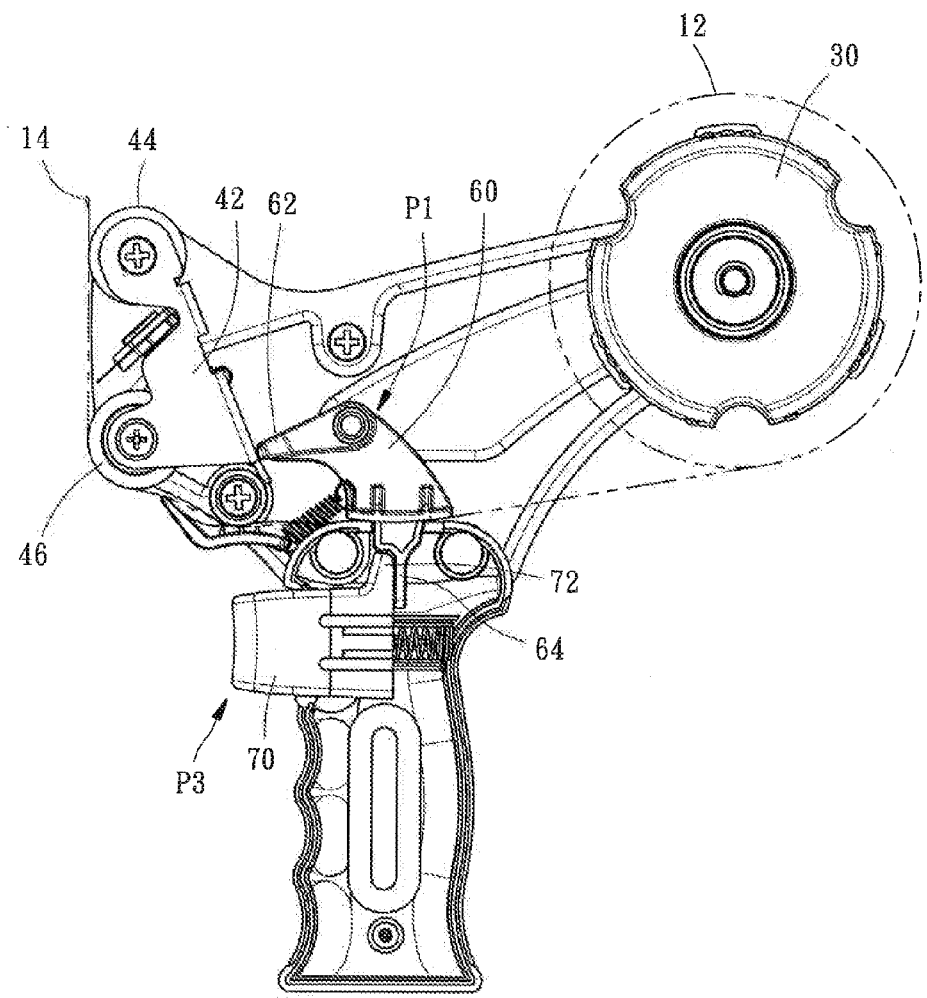
FIG. 6 is similar to FIG. 3, illustrating the status of the trigger before pressing.

The tape holder wheel 30 is pivotally mounted at a rear side of one side panel 26 of the rack 22 of the support unit 20 for holding an adhesive tape roll 12 (see FIG. 6).

The swing unit 40 comprises a swing frame 42, a first roller 44, and a second roller 46. The swing frame 42 has a top side thereof pivotally connected to a front side of the rack 22. The first roller 44 and the second roller 46 are respectively pivotally mounted in the swing frame 42 at top and bottom sides.

The cutting unit 50 comprises a cutter holder 52 and a cutter blade 54. The cutter holder 52 is fixedly mounted in the front side of the rack 22 between the first roller 44 and second roller 46 of the swing unit 40 for holding he cutter blade 54. Further, a third return member 84 (for example, tension spring) is connected between the cutter holder 52 and the swing frame 42 and adapted to provide an elastic restoring force to the swing frame 42.

The stopper member 60 is pivotally mounted in the rack 22, comprising a stop portion 62 extending toward the swing frame 42 and an extension portion 64 extending into the inside of the handle 24. Further, the stopper member 60 is movable between a stop position P1 (see FIG. 3 and FIG. 6) and a release position P2 (see FIG. 7). When the stopper member 60 is in the stop position P1 (see FIG. 3 and FIG. 6), the stop portion 62 of the stopper member 60 is stopped against the swing frame 42 to prohibit the swing frame 42 from swinging. On the contrary, when the stopper member 60 is in the release position P2 (see FIG. 7), the stop portion 62 of the stopper member 60 is kept away from the swing frame 42, allowing the swing frame 42 to swing.

The trigger 70 comprises a protruding portion 72 located at a top side thereof, a second guide portion 74 located at each of two opposite lateral sides thereof (see FIG. 2) for coupling to the first guide portions 242 of the handle 24 to guide movement of the trigger 70 relative to the handle 24 between an initial position P3 and a pressed position P4. When the trigger 70 is in the initial position P3 (See FIG. 3 and FIG. 6), the protruding portion 72 of the trigger 70 is stopped against the extension portion 64 of the stopper member 60 to hold the stopper member 60 in the stop position P1. When moving the trigger 70 to the pressed position P4 (see FIG. 7), the protruding portion 72 of the trigger 70 will push the extension portion 64 of the stopper member 60, biasing the stopper member 60 from the stop position P1 to the release position P2.

Figure 3:
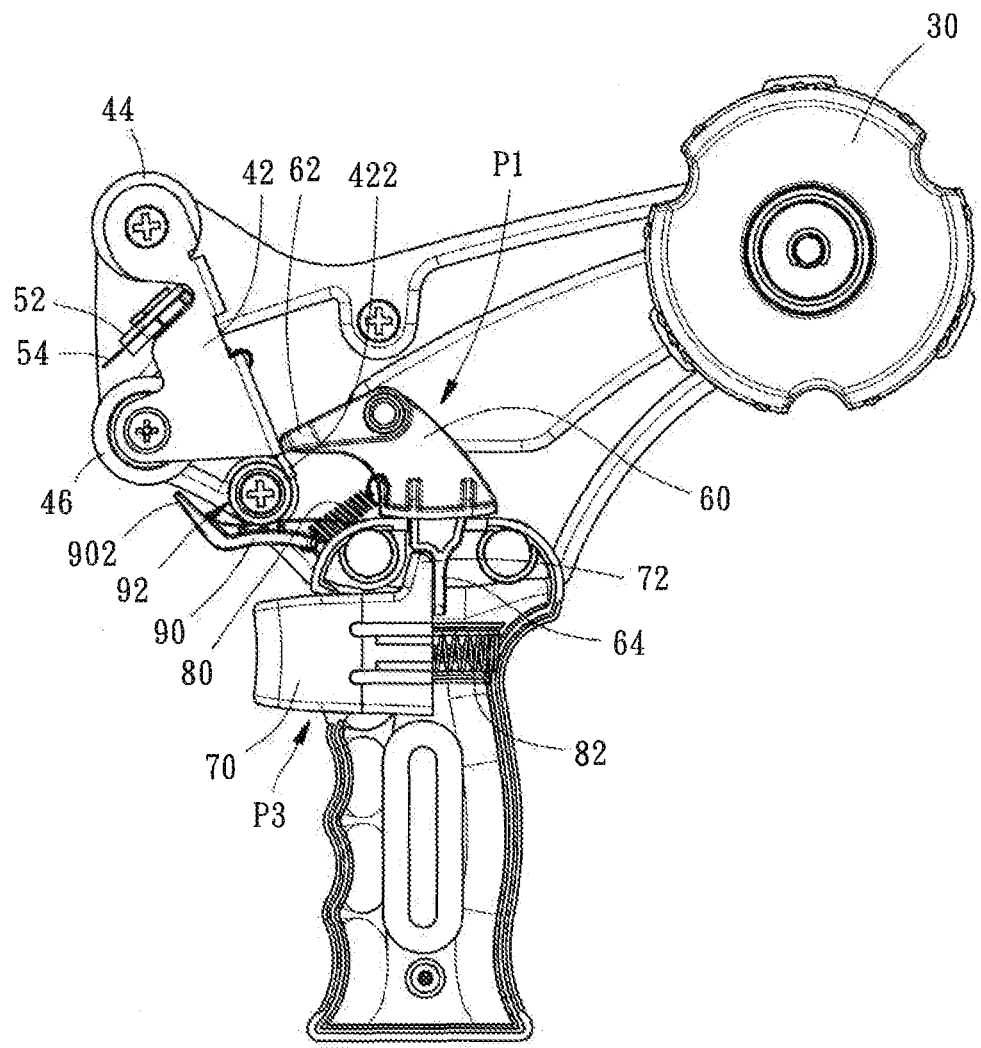
FIG. 3 is a sectional plain view of the trigger-operated adhesive tape dispenser in accordance with the present invention.

It is to be noted that the trigger-operated adhesive tape dispenser 10 further comprises a pressure plate 90, and a gear wheel 92 disposed between the swing frame 42 and the pressure plate 90, As illustrated in FIGS. 2-5, the pressure plate 90 has one end thereof pivotally connected to the handle 24, and an opposite end thereof obliquely extending toward the second roller 46 and terminating in a protruding portion 902. Further, the pressure plate 90 has three spaced ribs 904 located at the top side thereof (actually one rib is enough), and a one-way tooth block 906 located at one lateral side thereof. The gear wheel 92 is pivotally connected to the rack 22, comprising a large diameter portion 922 and a small diameter portion 924. The large diameter portion 922 of the gear wheel 92 is meshed with the ribs 904 of the pressure plate 90 (see FIG. 4) and the small diameter portion 924 of the gear wheel 92 is meshed with the one-way tooth block 906 of the pressure plate 90 (see FIG. 5), and therefore the gear wheel 92 can simply be rotated in one direction. Thus, the adhesive tape 14 of the adhesive tape roll 12 can be effectively constrained to lie between the large diameter portion 922 of the gear wheel 92 and the ribs 904 of the pressure plate 90. Further, the swing frame 42 has a bearing portion 422 located at a bottom side thereof for resting on the large diameter portion 922 of the gear wheel 92, as shown in FIGS. 2 and 3, to prevent the swing frame 42 from being excessively biased by the elastic restoring force of the third return member 84.

Figure 4:
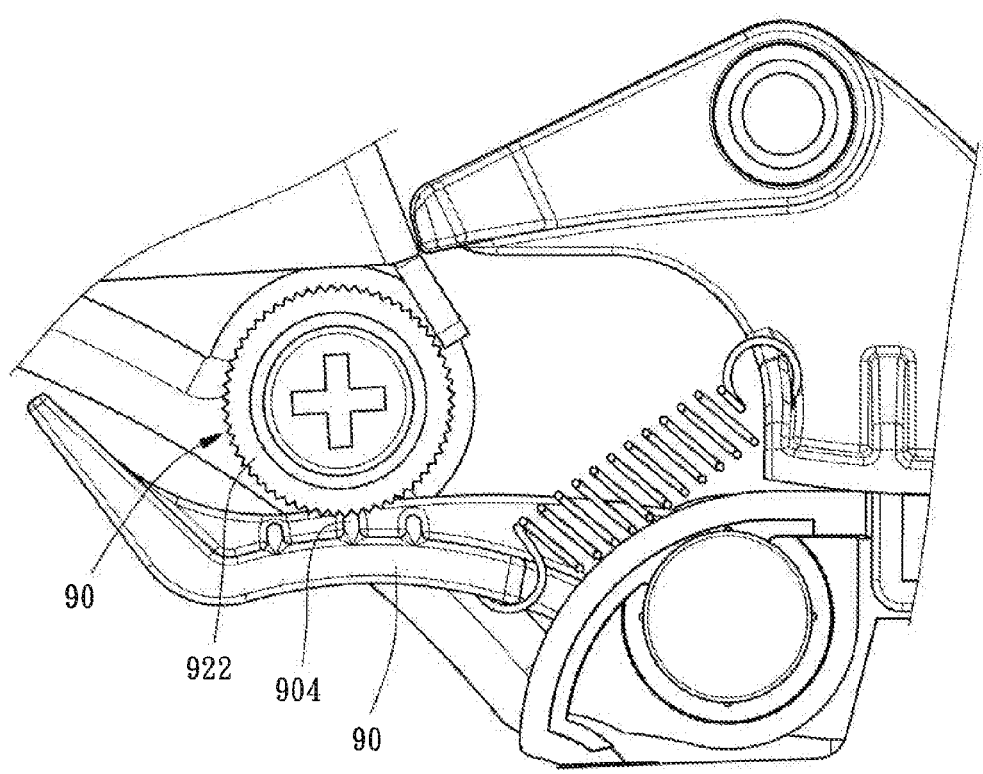
FIG. 4 is an enlarged view of a part of FIG. 3, illustrating the large diameter portion of the gear wheel meshed with the ribs of the pressure plate.
Figure 5:
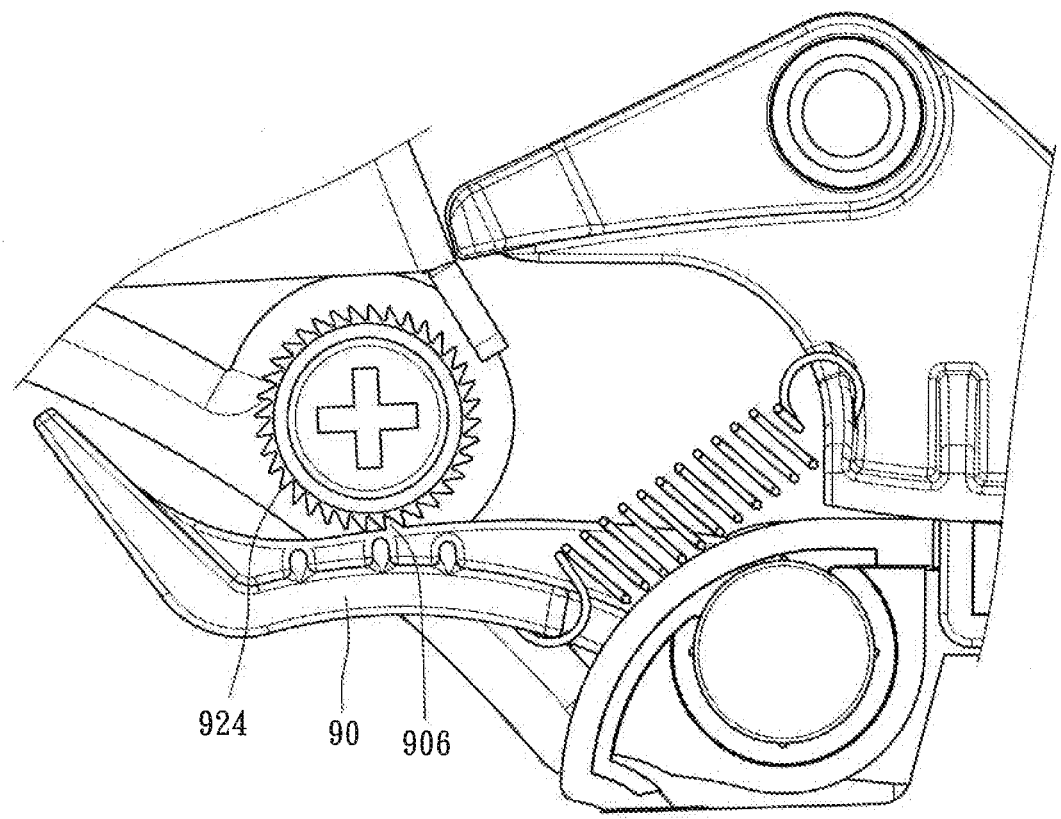
FIG. 5 is a sectional view of a part of the present invention, illustrating the small diameter portion of the gear wheel meshed with the one-way tooth block of the pressure plate.

The first return member 80 in this embodiment is a tension spring connected between the stopper member 60 and the pressure plate 90, as shown in FIGS. 3 and 4, and adapted for providing an elastic restoring force to hold the stopper member 60 in the stop position P1 and to keep the ribs 904 of the pressure plate 90 in mesh with the large diameter portion 922 of the gear wheel 92 flexibly. Said first return member 80 can be a spring or an elastomer.

The second return member 82 in this embodiment s a compression spring mounted between the trigger 70 and the handle 24, as shown in FIGS. 2 and 3, and adapted for providing an elastic restoring force to hold the trigger 70 in the initial position P3. Said second return member 82 can be a spring or an elastomer.

Figure 7:
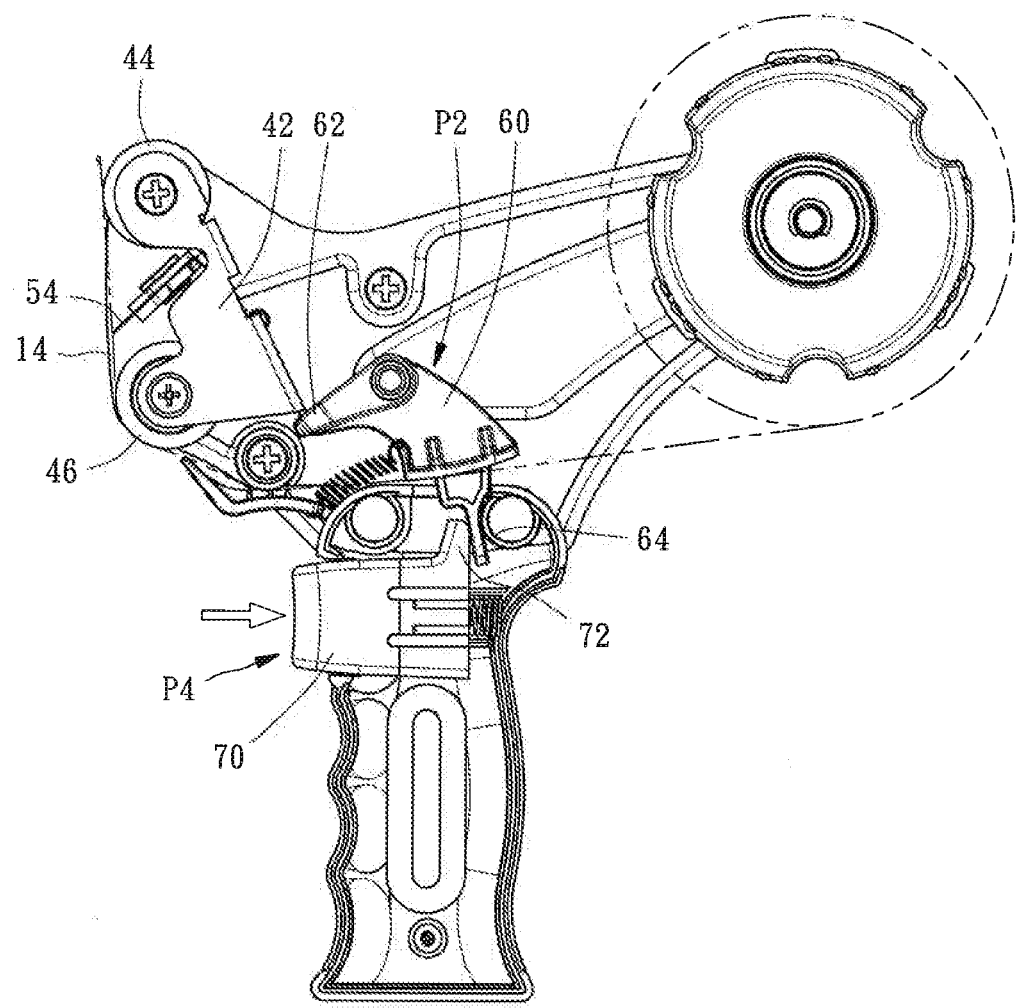
FIG. 7 is similar to FIG. 6, illustrating the trigger pressed.
Figure 8:
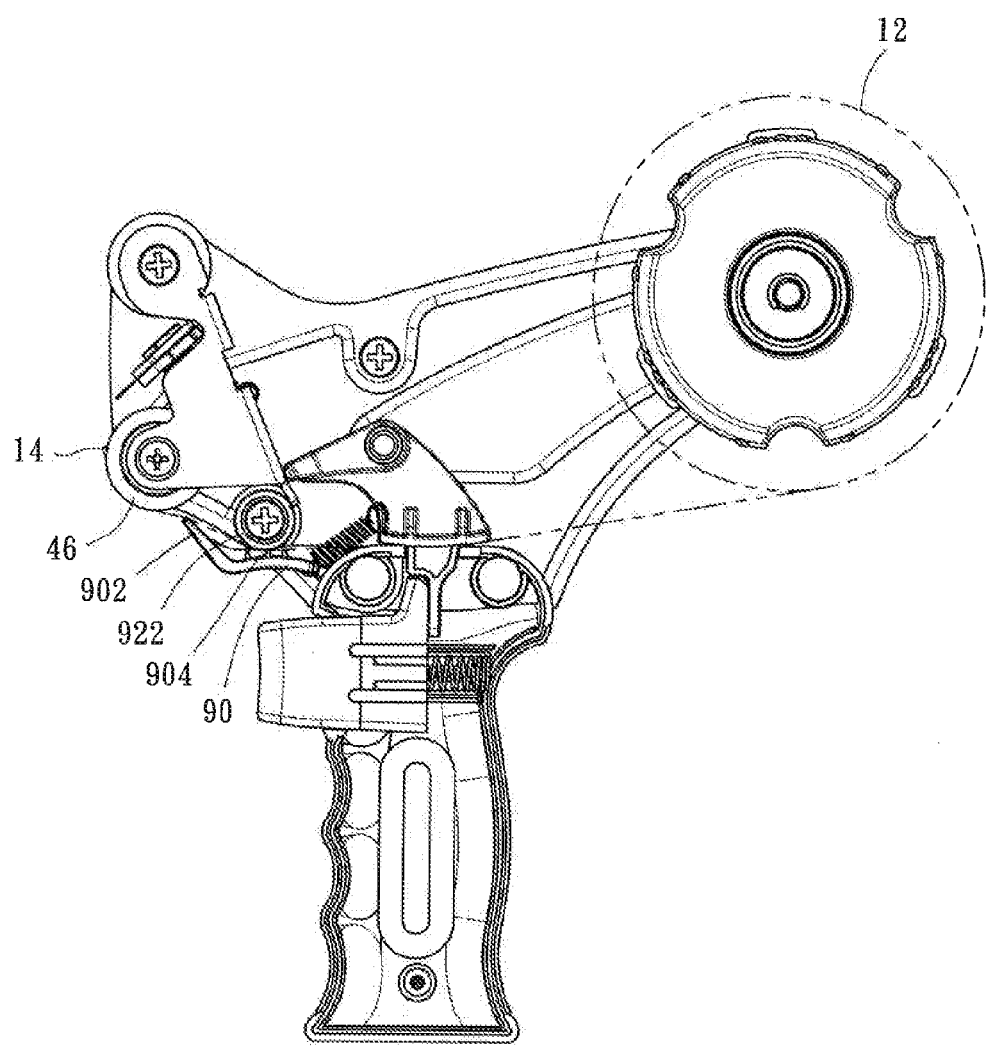
FIG. 8 is similar to FIG. 3, illustrating the adhesive tape cut off by the cutter blade.

At the initial stage when using the trigger-operated adhesive tape dispenser 10, as shown in FIG. 6, the trigger 70 is not pressed and maintained in the initial position P3. At this time, the stopper member 60 is held in the stop position P1 to stop the swing frame 42 in place. Under this condition, the user can move the trigger-operated adhesive tape dispenser 10 to rotate the first roller 44 and the second roller 46 and to further apply the adhesive tape 14 to the surface area of the object to be packed smoothly and to have the adhesive tape 14 be pulled out of the adhesive tape roll 12 to a proper length and kept in sufficient tension. At this time, the user can move the trigger 70 to the pressed position P4 to bias the stopper member 60 to the release position P2, as shown in FIG. 7. At this moment, the first roller 44 is still kept pressed on the surface of the object, and the second roller 46 will be forced by the tension force of the adhesive tape 14 to bias with the swing frame 42, and the adhesive tape 14 will be stopped at the cutter blade 54. Thus, the user simply needs to apply a downward pressure slightly, forcing the cutter blade 54 to cut off the adhesive tape 14. Once the adhesive tape 14 is been cut off, as shown in FIG. 4 and FIG. 8, one the one hand, the flexible engagement relationship between the large diameter portion 922 of the gear wheel 92 and the ribs 904 of the pressure plate 90 enables the adhesive tape 14 to be constrained to lie between the large diameter portion 922 of the gear wheel 92 and the ribs 904 of the pressure plate 90, preventing the adhesive tape 14 from being rolled back; on the other hand, the stopping effect of the protruding portion 902 of the pressure plate 90 enables the lead end of the adhesive tape 14 to be kept at the surface of the second roller 46 for a next application. Thereafter, the user simply needs to release the trigger 70 for enabling the stopper member 60 to be returned to the stop position P1, and a next application can be continuously performed.

In conclusion, the trigger-operated adhesive tape dispenser 10 uses the trigger 70 and the stopper member 60 to control the swinging operation of the swing frame 42, enabling the user to pull out of the adhesive tape 14 and then to cut off the applied adhesive tape 14 easily with less effort without adjusting the position of the adhesive tape. When compared to the conventional adhesive tape dispensers, the invention actually has the advantages of effortless operation and ease of use.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A trigger-operated adhesive tape dispenser, comprising:
a support unit comprising a rack and a handle affixed to said rack;
a tape holder wheel pivotally connected to said rack;
a swing unit comprising a swing frame, a first roller and a second roller, said swing frame being pivotally connected to said rack, said first roller and said second roller being respectively pivotally mounted in said swing frame at two opposite sides;
a cutting unit comprising a cutter holder fixedly mounted in said rack between said first roller and said second roller of said swing unit and a cutter blade affixed to said cutter holder;
a stopper member pivotally connected to said rack and movable between a stop position and a release position, said stopper member comprising a stop portion and an extension portion, said stop portion being stopped against said swing frame to prohibit said swing frame from being biased relative to said rack when said stopper member is in said stop position, said stop portion being kept away from said swing frame for allowing said swing frame to be biased relative to said rack when said stopper member is in said release position;
a trigger mounted at said handle and movable relative to said handle between an initial position and a pressed position, said trigger comprising a protruding portion, said protruding portion being stopped against said extension portion of said stopper member to hold said stopper member in said stop position when said trigger is in said initial position, said protruding portion being forced to push said extension portion of said stopper member and to further bias said stopper member from said stop position to said release position when said trigger is in said pressed position;
a first return member mounted at said stopper member and adapted to keep said stopper member in said stop position; and
a second return member mounted between said trigger and said handle and adapted to keep said trigger in said initial position.

2. The trigger-operated adhesive tape dispenser as claimed in claim 1, further comprising a pressure plate pivotally mounted at said handle and a gear wheel pivotally mounted at said rack, said pressure plate comprising at least one rib flexibly meshed with said gear wheel.

3. The trigger-operated adhesive tape dispenser as claimed in claim 2, wherein said pressure plate comprises a one-way tooth block meshed with said gear wheel.

4. The trigger-operated adhesive tape dispenser as claimed in claim 2, wherein said first return member is connected between said stopper member and said pressure plate.

5. The trigger-operated adhesive tape dispenser as claimed in claim 2, wherein said swing frame comprises a bearing portion located at a bottom side thereof and rested on said gear wheel.

6. The trigger-operated adhesive tape dispenser as claimed in claim 2, wherein said pressure plate comprises a protruding portion obliquely extended from one side thereof in a direction toward said second roller of said swing unit.

7. The trigger-operated adhesive tape dispenser as claimed in claim 1, further comprising a third return member connected between said swing frame and said cutter holder.

8. The trigger-operated adhesive tape dispenser as claimed in claim 1, wherein said handle comprises at least one first guide portion disposed at an inner side thereof; said trigger comprises at least one second guide portion disposed at an outer side thereof and respectively coupled to said first guide portion of said handle.

* * * * *